United States Patent [19]

Tennent

[11] Patent Number: 4,669,633

[45] Date of Patent: Jun. 2, 1987

[54] MACHINE FOR INSERTING ELONGATED CYLINDRICAL OBJECTS INTO MAILING RECEPTACLES

[76] Inventor: David F. Tennent, 9426 Goshen La., Burke, Va. 22015

[21] Appl. No.: 649,763

[22] Filed: Sep. 12, 1984

[51] Int. Cl.⁴ .............................................. B65G 59/00
[52] U.S. Cl. .................................... 221/175; 221/299; 312/73
[58] Field of Search ............... 221/174, 281, 241, 242, 221/299, 175, 296, 282; 414/126, 745, 748; 211/59.2, 59.3, 59.4, 175; 312/45, 72, 73, 42; 193/38, 41; 198/540, 550.1; 52/192, 195, 197

[56] References Cited

U.S. PATENT DOCUMENTS

| | | | |
|---|---|---|---|
| 3,018,001 | 1/1962 | Combs | 211/59.2 |
| 3,410,452 | 11/1968 | Igel et al. | 221/299 X |
| 3,817,424 | 6/1974 | Blundin | 221/175 |
| 4,119,243 | 10/1978 | Marecek et al. | 221/296 X |
| 4,388,039 | 6/1983 | Schwarze | 414/748 |

FOREIGN PATENT DOCUMENTS 2621263  11/1977  Fed. Rep. of Germany ...... 221/241

Primary Examiner—F. J. Bartuska
Assistant Examiner—Gregory L. Huson
Attorney, Agent, or Firm—William F. Frank

[57] ABSTRACT

A machine for the insertion of elongated cylindrical objects into a rapidly moving stream of envelopes at a rate of delivery equal to that of the basic machine. The invention comprises a supply hopper for the objects, a trough to feed the objects to a delivery station and a horizontally reciprocating assembly which takes one object at a time from the trough and feeds it into an open envelope. This assembly is operated by the basic machine and so feeds the objects at whatever rate the basic machine is moving the open envelopes past the insertion stations.

3 Claims, 11 Drawing Figures

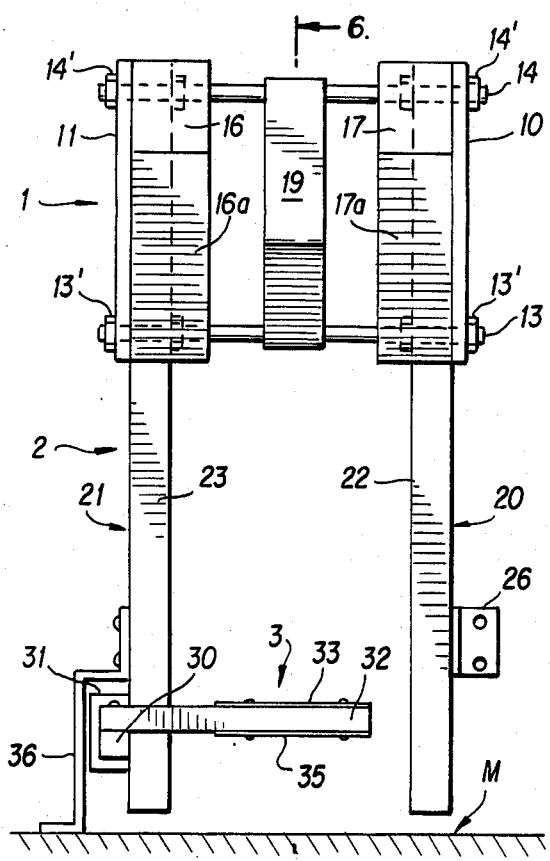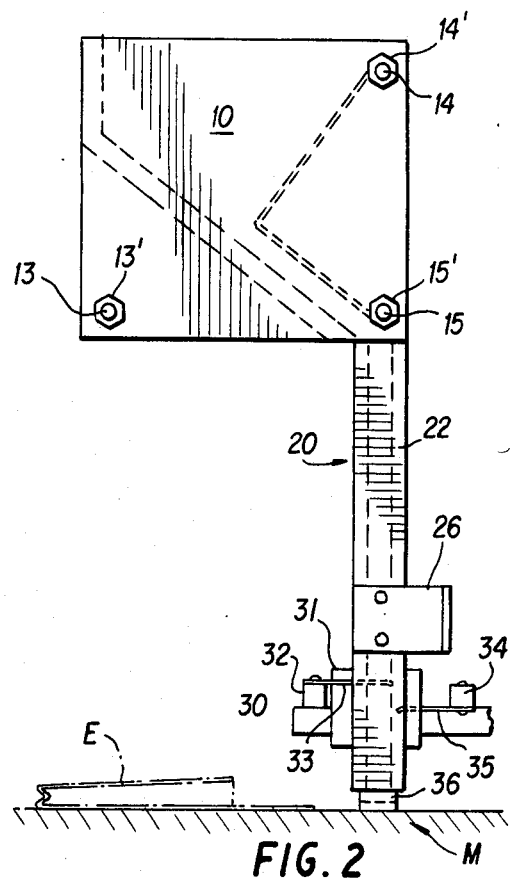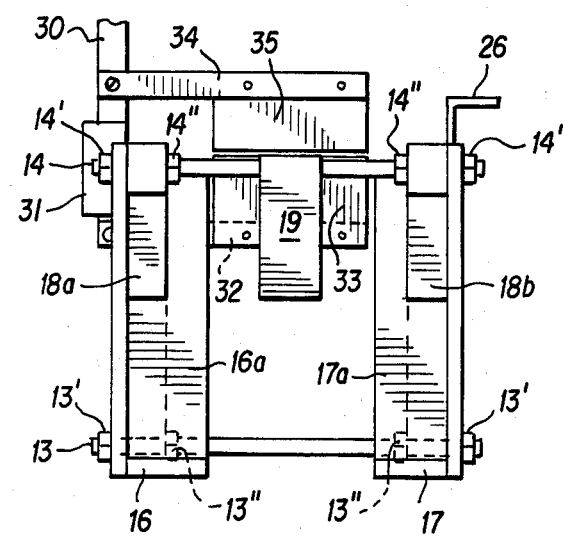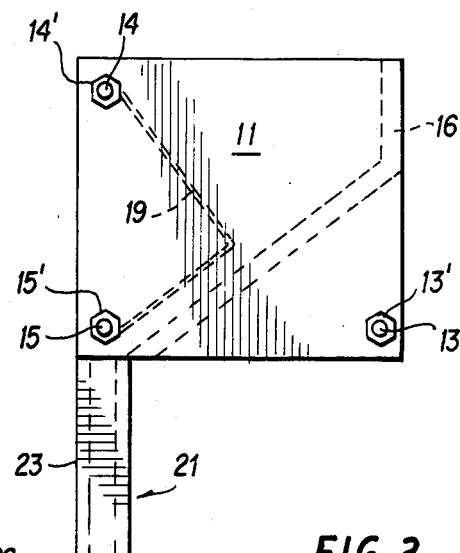

MACHINE FOR INSERTING ELONGATED CYLINDRICAL OBJECTS INTO MAILING RECEPTACLES

FIELD OF INVENTION

The present invention is in the field of mass mailing of flat receptacles containing a plurality of inserts, generally flat but occasionally including an elongated cylindrical object such as a pen. More specifically, the invention relates to machines which insert such a pen into an envelope on a mass, rapidly-moving basis.

BACKGROUND OF THE INVENTION

Modern advertising and solicitation campaigns involve the assembly and mailing of hundreds of thousands of envelopes each containing a plurality of letters of appeal, coupons, order blanks, return envelopes, leaflets offering services and/or products and the like, and very often inexpensively-produced ball-point pens. Machines have been made which move numbers of envelopes past inserting stations where the various items are inserted into each envelope as it passes each station. The construction of the basic machine is such that the envelope is held open as it passes down the line of insert stations. When the inserts are generally flat, each insert is moved into the open envelope by a reciprocating finger or vacuum device moving over the stack of the insert. Insertion of objects such as the ball-point pens does not lend itself to such a manner of insertion. Manual insertion of a pen is feasible but slow and controls the ultimate speed at which the insertion process can be maintained. Currently, insertion machines process envelopes up to a rate of 3,000 envelopes per hour. Machines to insert pens have been developed but have not been capable of operating at the speed of 3,000 inserts of pens per hour. The insertion rate has been less than 500 per hour and the insertions have been halted by feeding jams and mechanical failures of the machines.

SUMMARY OF THE PRESENT INVENTION

The present invention is a machine for the insertion of elongated cylindrical objects into a rapidly moving stream of envelopes at a rate of delivery equal to that of the basic machine. The present invention comprises a supply hopper for the objects, a trough to feed the objects to a delivery station and a horizontally reciprocating assembly which takes one object at a time from the trough and feeds it into the open envelope. This latter assembly is operated by the basic machine and so feeds the objects at whatever rate the basic machine is moving the open envelopes past the insertion stations.

The present machine has, in one particular operation, fed ballpoint pens at the rate of 3,000 per hour into 1.8 million envelopes without failure or interruption of the insertion process.

DESCRIPTION OF THE DRAWINGS

The present invention can be seen in an illustrative embodiment for the feeding of ballpoint pens in the accompanying drawings in which:

FIG. 1 is a front elevation view of the invention as it would be installed on a basic multiple insertion station machine.

FIG. 2 is a right side elevation view of FIG. 1.

FIG. 3 is a left side elevation view of FIG. 1.

FIG. 4 is a top plan view of FIG. 1.

DETAILED DESCRIPTION OF THE INVENTION

Figure 5:
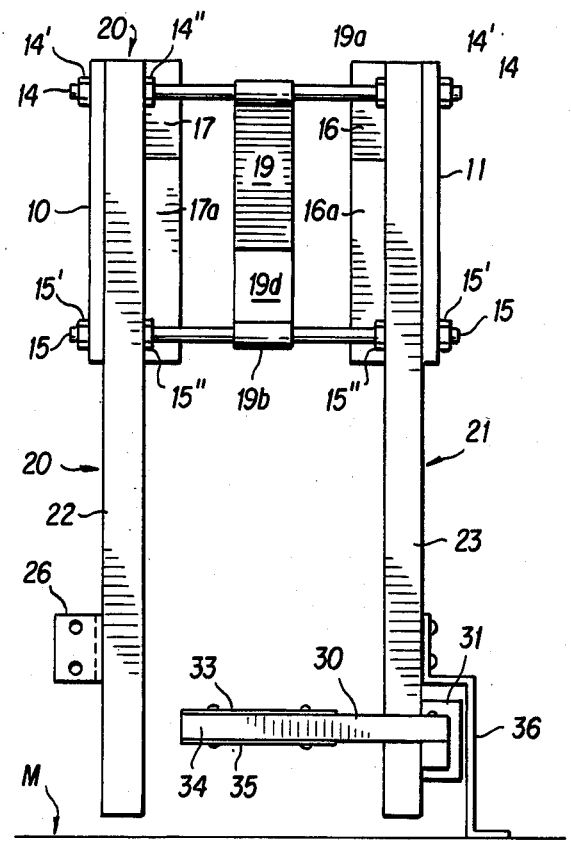
FIG. 5 is a rear elevation view of FIG. 1.
Figure 6:
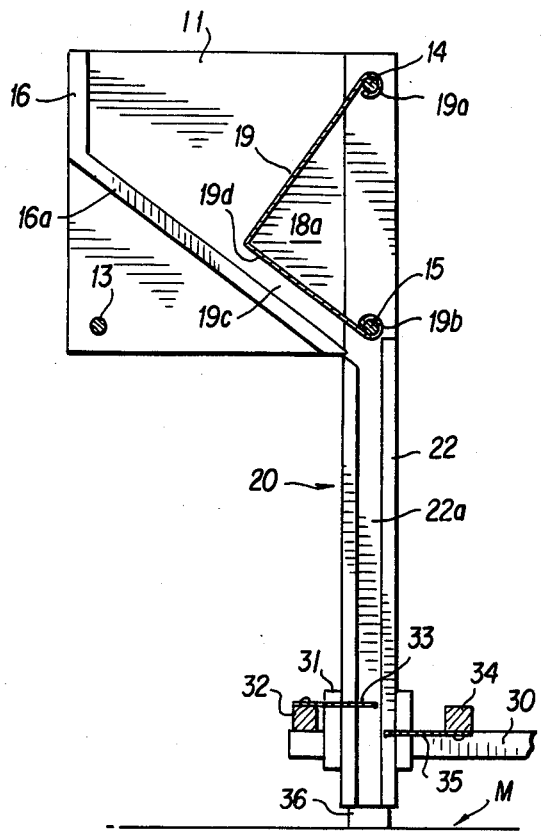
FIG. 6 is a cross-sectional view along the plane 6—6 in FIG. 1.

Referring to FIGS. 1-6, the present invention is comprised of a supply hopper assembly 1, a vertical trough feeding assembly 2 and a delivery assembly 3.

The supply hopper assembly comprises a pair of vertically disposed, parallel side plates 10 and 11 spacedly mounted from each other on threaded shafts 12, 13, 14 & 15 and adjustably so mounted by means of external nuts 12', 13', 14' & 15' and of internals nuts 12", 13", 14" & 15" respectively. Attached to the upper portion of the inner surface of each side plate is a front hopper plate 16 & 17 extending vertically downwardly to its respective inwardly and downwardly inclined bottom plate 16a & 17a. The supply hopper assembly is completed by a back plate comprising a substantially triangular guide plate 18a & 18b on the respective side plates 10 & 11 with the hypotenuse of each guide plate lying along the vertical back edge of each side plate and a V-shaped back support 19 positioned between the guide plates 18a & 18b, the upper edge 19a of support plate 19 being rolled around shaft 14 and the lower edge 19b of plate 19 being rolled around shaft 15 (FIG. 6) thus forming slot 19c between bottom plates 16a & 17a and the lower portion 19d of plate 19.

The vertical trough feeding assembly 2 comprises a pair of vertical members 20 & 21, each dependingly mounted along the rear edge of its respective side plate 10 & 11. The threaded shafts 14 & 15 pass through the members 20 & 21 which, being secured to the side plates 10 & 11 by nuts 14', 15', 14" & 15" can be adjusted to the length of the objects to be inserted. The portion 22 & 23 of each member 20 & 21 extending below the respective side plate and opposing each other carries a vertical slot therein, 22a & 23a respectively, in which the ends of the insertable objects fit and are guided into the delivery assembly 3 as a gravity feed. The upper ends 24 & 25 respectively of slots 22a & 23a are mated the slot 19c formed between hopper back plate 19 and lower hopper bottom plate 16b & 17b. To mount the present invention on the basic insertion machine, brackets are provided for the depending members 20 & 21. One bracket 26 is positionable on the outer surface of member 20 as may be dictated by the design of the basic machine. The other bracket is attached to the feeding assembly 3 and will be described in the description of that assembly.

Figure 7:
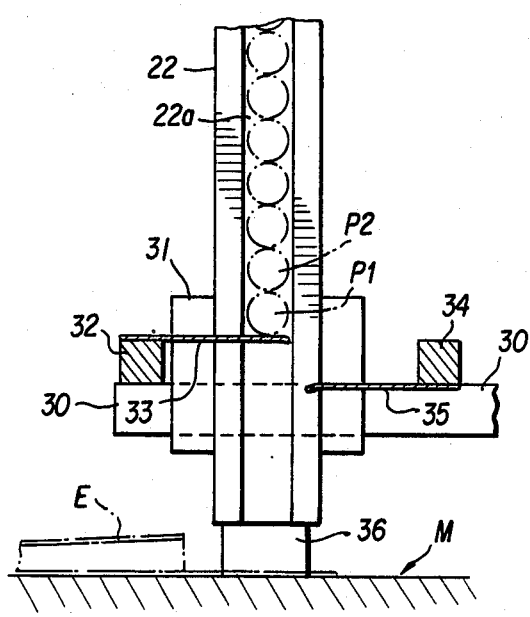
FIGS. 7-10 are enlarged views of the segment 7-10 as seen in FIG. 6 showing the feeding sequence of a pen from the machine to the path for insertion into an open envelope.
Figure 8:
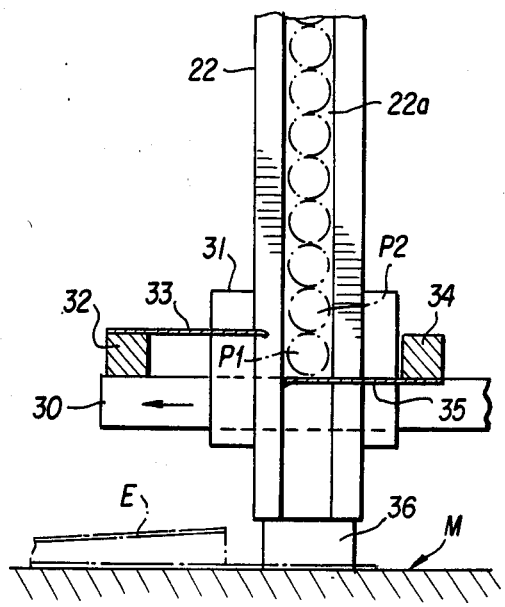
Figure 9:
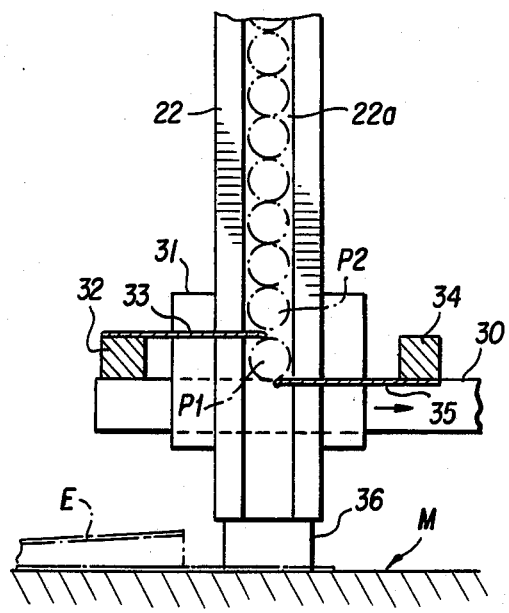
Figure 10:
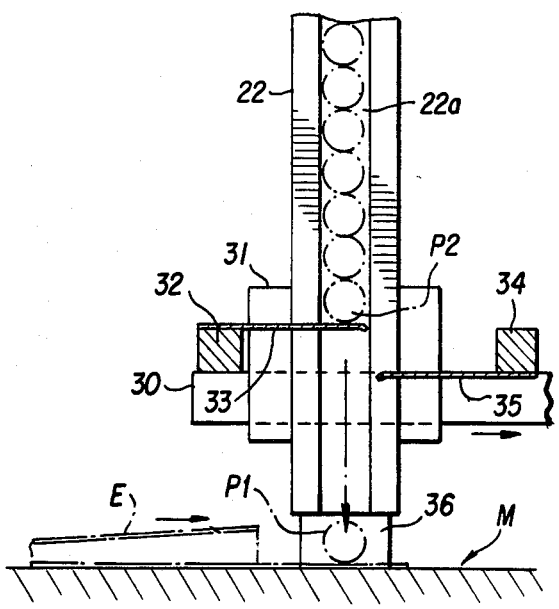

The feeding assembly 3 is comprised of a horizontally reciprocating bar 30 mounted for said movement in housing 31 which is attached to member 21 where and as shown. The forward end portion of bar 30 reciprocates within housing 31 in response to the movement of the rear portion of bar 30 which is connected to the basic machine activating element for that type of insertion station. On the forward end of bar 30, below the hopper assembly 1 and forward of members 20 & 21, feed arm 32 is attached perpendicular to bar 30 and extends inwardly below the hopper assembly 1. Attached to the undersurface of arm 32 and extending between members 20 & 21, but spaced laterally from each member, is laterally adjustable feed plate 33. On the underside of bar 30 and on the opposite side of member 20 & 21 from feed arm 31 is mounted delivery arm 34 carrying laterally adjustable delivery plate 35 on its underside, plate 35 extending toward feed plate 33 but below that plate a distance equal to the diameter of the objects in slots 22a & 23a (FIGS. 7-9). The other support bracket 36, previously mentioned, is attached to housing 31 and will have such form as may be required to securely mount member 21 to the basic machine. The feed plate and the delivery plate may be reversed relative to the members 20 & 21 and positions on bar 30 interchanged.

Figure 11:
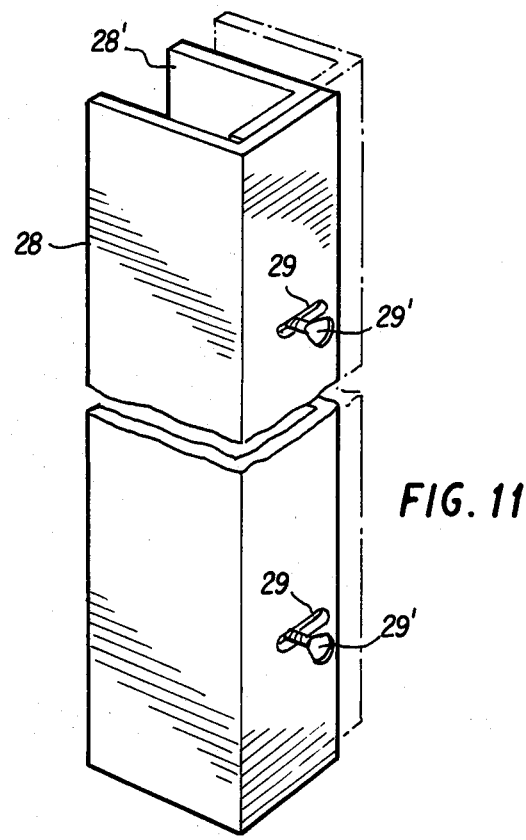
FIG. 11 is a perspective view of another embodiment of the invention illustrating a delivery trough in which the channel width may be increased.

The members 20 & 21 can be changed to provide slot widths according to the objects to be inserted. However, FIG. 11 shows a member in which the slot can be adjusted in width. Such a member 27 comprises two angles 28 & 28' forming a slot the width of which can be increased by means of slots 29 and screw means 29', for example, thumb-headed screws, as shown in phantom lines.

In operation, the insertion process begins with the feed assembly 3 in the positions shown in FIG. 7, the slots 22a & 23a being filled with objects to be inserted, for example, ball-point pens P. The lower-most pen P1 rests on feed plate 33 and bar 30 is in its rearmost position. The forward movement of bar 30 removes feed plate 33 from under pen P1 allowing it to fall onto delivery plate 35 which has moved forward as seen in FIG. 8. It should be noted that delivery plate 35 underlies feed plate 33 slightly so that pen P1 is not at the edge of plate 35 as seen in FIG. 8 when bar 30 has reached its limit of forward movement. In FIG. 9, as bar 30 has moved about half the distance of its rearward movement in response to the action of the basic machine, it will be seen that pen P2 is now resting on plate 33 and pen P1 is yet on plate 35. When bar 30 is in its rearmost position, pen P2 is yet on plate 33, but pen P1 has been discharged from plate 35 into the envlope E which has been fed by the basic machine into the position shown by means which are not a part of this invention and which are well known to those of skill in the insertion art.

The construction of the delivery system 3 provides assured delivery of each object for insertion and simultaneously prevents any jamming of the obects to be delivered. It should also be pointed out that the open area between the hopper front plates 16 & 17 and bottom plates 16a and 17a not only facilitates loading of the hopper assembly but allows the loader to make certain the objects are aligned as horizontally as possible to easily correct any misalignment.

While the present invention has been presented in an embodiment for the actual utilization in the insertion of ballpoint pens into envelopes, such changes in size, materials, form and the like as may occur to skilled artisans are considered to come within the principles of the invention as set forth in the claims hereto.

What is claimed is:

1. A device for the insertion of elongated, cylindrical objects into envelopes as one part of the insertion of a plurality of insertions into said envelopes in a high volume, rapidly moving process comprising, in combination, a supply hopper for the said objects, a vertically mounted trough assembly to feed said objects by gravity to a delivery station and a horizontally reciprocating assembly at said delivery station which takes one object at a time from said trough assembly and feeds said object into each of said envelopes as they are positioned below said horizontally reciprocating assembly, wherein said hopper comprises a pair of vertically disposed, parallel, spaced apart side plates mounted on means which provide for adjusting the spacing between said side plates, a pair of spaced apart front hopper plates mounted on the upper portions of the inner surfaces of said side plates, a pair of spaced apart bottom plates extending downwardly and inwardly along the lower inner surfaces of said side plates and a substantially triangular back plate of Vee shape between the rear vertical edges of said side plates with the hypotenuse of said back plate lying along the vertical edges of said side plates, the lower side of said back plate and the said bottom plates forming a slot within said hopper assembly leading to said trough assembly.

2. The device according to claim 1 wherein said trough assembly comprises a pair of vertical members each dependingly mounted along the rear vertical edges of said side plates and extending therebelow, the portion of each vertical member extending below its respective side plate carrying a vertical slot therein the upper end of each slot mating with the said slot formed between said hopper back plate and said hopper bottom plates to receive the ends of said objects as they move by gravity from said hopper and retain said objects in said trough slots until said objects are removed one by one from said trough slots at said delivery station by said horizontally reciprocating assembly.

3. The device according to claim 2 wherein said horizontally reciprocating assembly comprising a horizontally reciprocating bar mounted in a housing on one of said depending members, said bar being reciprocatingly moved by an element on a machine for carrying out the entire insertion process, a feed arm attached perpendicular to the forward end of said bar and extending under said hopper and in front of said trough assembly, a feed plate attached to the underside of said feed arm and extending rearwardly of said feed arm between said vertical members, a delivery arm attached to said bar on the opposite side of said vertical members from said feed arm and a delivery plate positioned on the underside of said delivery arm and extending toward said feed plate but below said feed plate a distance equal to the diameter of said objects in said vertical slots, said feed plate holding the lowermost of said objects in said slots until moved forward by said bar movement, said delivery plate receiving said object from said feed plate upon said forward movement of said bar and retaining said object until said feed plate is moved under the penultimate object in said slots by start of the rearward movement of said bar, said delivery plate discharging said object thereon into said envelope on the completion of said rearward movement of said bar.

* * * * *